United States Patent [19]

Moraillon

[11] Patent Number: 4,604,126
[45] Date of Patent: Aug. 5, 1986

[54] NP/NPK FERTILIZER GRANULES COMPRISED OF AMMONIUM PHOSPHATE

[75] Inventor: Philippe Moraillon, Saint-Germain-en-Laye, France

[73] Assignee: Generale des Engrais S.A., Neuilly-sur-Seine, France

[21] Appl. No.: 258,460

[22] Filed: Apr. 28, 1981

[30] Foreign Application Priority Data

May 5, 1980 [FR] France ............... 80 09952

[51] Int. Cl.⁴ .............................................. C05B 7/00
[52] U.S. Cl. ........................................... 71/34; 71/36; 71/43; 71/29; 71/64.05; 71/64.06
[58] Field of Search ............... 71/34, 43, 64.05, 64.06, 71/29

[56] References Cited

U.S. PATENT DOCUMENTS

| | | | |
|---|---|---|---|
| 2,047,393 | 7/1936 | Siems | 71/9 |
| 3,037,855 | 6/1962 | Smith | 71/64.06 |
| 3,369,885 | 2/1968 | Takahashi et al. | 71/64.06 X |
| 3,738,821 | 6/1973 | Barber | 71/64.05 X |
| 4,134,750 | 1/1979 | Norton et al. | 71/29 |
| 4,316,736 | 2/1982 | Van Hijfte et al. | 71/64.06 X |

FOREIGN PATENT DOCUMENTS

676584 7/1979 U.S.S.R. ............... 71/64.6

Primary Examiner—Ferris H. Lander
Attorney, Agent, or Firm—Burns, Doane, Swecker & Mathis

[57] ABSTRACT

Granular fertilizer solids comprising ammonium phosphate, advantageously particulate NP/NPK fertilizers, are prepared by (i) granulating a liquid/dry solids admixture of fertilizer values in a granulation zone, (ii) next transferring said admixture to, and drying same, in a drying zone, (iii) while simultaneously injecting into said drying zone a jet spray of a slurry of ammonia neutralized acid values discharged from a pipe reactor, such that (iv) said jet spray directly impinges upon drying particles of wet solids transferred from said granulation zone, and whereby (v) dried final product simultaneously results therefrom, and (vi) then recovering a fraction of said dried final product, while (vii) recycling another fraction thereof, as dry solids, to said granulation zone.

39 Claims, 1 Drawing Figure

NP/NPK FERTILIZER GRANULES COMPRISED OF AMMONIUM PHOSPHATE

BACKGROUND OF THE INVENTION

1. Field of the Invention

The present invention relates to the preparation of granular fertilizer solids, and, more especially, to the preparation of granular NP/NPK fertilizers comprising ammonium phosphate.

2. Description of the Prior Art

It has long been known to this art to granulate fertilizers from liquid raw materials by utilizing any one of a number of acceptable techniques. One apparently simple method comprises effecting granulation and drying in a single unitary operation, as described, for example, in French Pat. Nos. 1,100,817 and 1,351,668 (U.S. Pat. No. 3,227,789). However, this type of procedure suffers from certain disadvantages, such as: a high water content in the slurry, limited production capacity, the impossibility of producing particular types of fertilizer, or certain formulae, and the impossibility of injecting a makeup amount of ammonia into the wet solid phase.

Consequently, efforts have been directed towards granulation processes performed in two separate operations, e.g., in a mixer (or granulator) and then a drier which are disposed in series in the same granulation circuit.

Unfortunately, when a large proportion of raw materials in liquid form (molten mass, aqueous suspension or solution of fertilizer species) is introduced into the granulator of a conventional granulating installation, a substantial amount of the dried material has to be recycled to the granulator in order to reduce the moisture content and the temperature of the material contained in the granulator, to a level which is conpatible with effective granulation. The recycling required typically ranges from 5 to 12 times the actual production.

French Pat. No. 1,389,361 (U.S. Pat. No. 3,348,938) proposes overcoming this disadvantage by spraying into the drier a portion of the liquid fertilizer species, in particular a slurry of monoammonium and diammonium phosphates. The required recycling of dried material is thus reduced to less than 5 times the production.

However, while this process is excellent in principle, it requires additional apparatus for neutralizing phosphoric acid with ammonia, comprising, for example, one or two stirred vessels. And water vapor produced by the heat of reaction has to be separated from the slurry and discharged by suitable means. It is also necessary to provide a pump for passing the slurry under pressure to the drier, a slurry flow meter, and spraying means for introducing the slurry into the drier.

The aforesaid slurry must be sufficiently fluid for it to be pumped and sprayed, and this requires a water content which is between 12 and 20% depending on the N:P atomic ratio in the mixture of monoammonium and diammonium phosphates.

When the aforenoted atomic ratio is 1.6, as set forth in said French Pat. No. 1,389,361, it too is known that loss of ammonia in the neutralization and drying steps is high, on the order of from 10 to 20% of the ammonia introduced. Such losses can be recovered in a suitable gas washing system, by means of phosphoric acid for example, but, in order for the liquid circulating in the washing system to remain sufficiently fluid, a substantial amount of water, which is proportional to the amount of ammonia to be recovered, has to be introduced. And this necessitates increasing the dimensions of the drier and enhancing heat consumption.

In the preparation of fertilizers, it is also known to use a tubular reactor in order to provide for contact between sulfuric or phosphoric acid and ammonia, and to separate the water vapor created from the slurry produced in a cyclone, as disclosed in U.S. Pat. No. 2,755,176, or in U.S. Pat. No. 3,310,371. Unfortunately, the cyclone separator is subject to blockage which makes the operation difficult.

It has also been proposed that ammonium sulfate and phosphate base fertilizers may be produced by means of a tubular reaction vessel for neutralization of the acids, communicating directly into the granulator without first separating off the water vapor, as described in U.S. Pat. No. 3,954,942. This process is likely suitable when using salts which are relatively weakly soluble, such as ammonium sulfate and phosphate; nonetheless, in order to avoid an excessive rate of recycling, a portion of the ammonium sulfate often has to be introduced in solid form, or a portion of the $P_2O_5$ often has to be introduced in the form of solid superphosphate, as is apparent from the actual working examples of the aforesaid '942 patent. When the fertilizer incorporates substances which are highly soluble in a hot condition, such as ammonium nitrate or urea, which are introduced into the granulator in the form of a solution, direct projection of the water vapor generated by the heat of acid neutralization onto the bed of product in the granulator results in a considerable rise in the temperature and the humidity of the product in the granulator, and makes it necessary to maintain a high rate of recycling which is generally between 6 and 10 times the production, depending on the formulation being produced, and the water content of the raw materials used.

See also, generally, and for background purposes, U.S. Pat. Nos. 2,926,079, 3,092,489, 3,241,946 and 3,333,297; French Pat. Nos. 1,206,786, 1,128,993, 1,573,849 and 2,437,386; British Pat. Nos. 1,252,651 and 1,379,761; and Canadian Pat. No. 592,240.

SUMMARY OF THE INVENTION

Accordingly, a major object of the present invention is the provision of an improved process for the preparation of granular fertilizer solids which is devoid of those drawbacks and disadvantages to date characterizing this art.

Another object of this invention is the provision of improved apparatus for the preparation of such fertilizer particulates, which apparatus requires neither vessels for neutralization of phosphoric acid with ammonia, nor for the separation and discharge of the water vapor produced, nor a slurry pump, nor a slurry flow meter, nor means for spraying slurry at the drier inlet.

Another object of the invention is the improved production of granulated NP or NPK fertilizers containing ammonium nitrate or urea, from nitrogen-bearing and phosphate-bearing raw materials which are entirely in liquid form, and wherein the extent of recycling of dried material is much lower than in the conventional processes, e.g., is between only 2 and 5 times the amount of actual production.

Another object of the invention is to permit spraying a highly concentrated slurry, and even a molten material, containing only 1 to 8% of water, into the drier of such granulator/drier apparatus, thereby to reduce the dimensions of the drier and to reduce or even totally eliminate heating requirements.

Yet another object of the invention is to reduce the loss in respect of ammonia to be recovered in the gas washing system, this parameter also featuring simplifying apparatus requirements and saving heat energy.

Still another object of the invention is to permit the production of granulated diammonium phosphate with a much lower rate of recycling vis-a-vis the existing processes.

Briefly, the present invention features a continuous process for the production of solid particulates comprised of ammonium phosphate, in particular granulated NP/NPK fertilizers, wherein recycled dried product and liquid and solid feedstocks are introduced into a mixing zone, the resulting mixture is passed into a drying zone through which passes a flow of hot gas, an acid liquid and an ammoniacal fluid are simultaneously introduced into a confined and elongate reaction zone, thus producing a jet of reaction mixture which comprises slurry and water vapor, said process being characterized in that said confined and elongate reaction zone is arranged and constructed as to directly openly communicate into the drying zone such as to project the reaction mixture of slurry and water vapor onto the wet solid product which emanates from said mixing zone, and simultaneously to dry the product resulting therefrom, and thence collecting the resulting dry product at the outlet of the drying zone.

BRIEF DESCRIPTION OF THE DRAWING

The FIGURE of Drawing is a schematic diagram of apparatus suitable for the production of fertilizer particulates according to the invention.

DETAILED DESCRIPTION OF THE INVENTION

More particularly according to this invention, the water vapor is charged into the drying zone at the same time as the slurry; this in contradistinction to the various embodiments of the prior art where the water vapor which is given off by the reaction between the acid and ammonia is always separated from the slurry before the slurry, mixed with the solid materials, is transferred into the drying zone, and the separation operation is performed in the neutralization vessel, at the outlet from the tubular reaction vessel, or in the granulator itself.

And unpredictably vis-a-vis the teachings of the prior art, the fact that the water vapor produced by the reaction is charged into the drying zone at the same time as the slurry unexpectedly does not in any way impair the efficiency of the drying operation.

The mixing zone is defined by any known means, such as a pug mill, a pan granulator, a rotary drum or any other mixing apparatus. The recycled solid product, the solid raw materials, for example, a potassium salt, superphosphate and liquid materials such as a slurry of ammonium phosphate, or a concentrated solution of ammonium nitrate or urea, are continuously introduced into the mixing zone.

In the usual processes of this type, the essence of the granulation operation is produced in the mixer apparatus which, for that very reason, is itself referred to as the "granulator". It is conventional practice for ammonia to be injected into the wet, moving solid material in order to neutralize the acidity of the superphosphate, or increase the N/P atomic ratio of the ammonium phosphate. A granulator apparatus provided with a device or means for injecting ammonia under the bed of product is commonly referred to as an "ammoniator-granulator".

Hereinafter, the term "granulator" will always be used to refer to the apparatus which circumscribes/defines the mixing zone, irrespective of the degree of granulation and/or ammoniation which is obtained under the operating conditions selected.

The drying zone is preferably defined by means of a rotary drier which is internally provided with blades for lifting the wet solid product from the mixer, and distributing it in the form of a shower in the working volume of the apparatus.

A stream of hot gases traverses the apparatus, preferably flowing in the same direction, or cocurrently as the product.

The confined and elongate reaction zone is comprised of an apparatus which is typically referred to as a "tubular reactor", and such expression will be used throughout the following specification. The device may be a simple hollow cylinder which is provided at one end with pipe or tube inlets for introducing the reactants. The cylinder or tube may be provided with elements or means capable of disturbing or interrupting the flow of the fluids, for example, spiral and baffle members, elbows, bends, constrictions, enlargements and venturis. Preferably, the dimensions and the configuration of the apparatus are so determined that the efficiency in respect of fixing ammonia is better than 99% when the phosphoric acid is neutralized to monoammonium phosphate.

The outlet nozzle or pipe of the tubular reactor is preferably positioned at the inlet or close to the inlet of the drier drum and relatively close to the axis thereof. In this case, the apparatus is oriented such that the jet of reaction products impinges upon the wall of the drier as far away therefrom as is possible. The initial angle of the jet relative to the axis of the drier drum is reduced in proportion to the outlet nozzle being moved closer towards the axis of the drum.

Without departing from the scope of this invention, it too is possible for a plurality of tubular reactors to be installed, some adjacent the others, in the above-described position. It is also possible for the tubular reactor to be provided with a plurality of outlet nozzles. Although it is generally preferable for the tubular reactor to be installed or positioned at the inlet of the drier, it is also possible to conduct the process with the tubular reactor installed/situated at the other end, close to the outlet of the drier, projecting the reaction products in the upstream direction of the drier.

The ammoniacal fluid which is introduced into the tubular reactor is typically anhydrous ammonia, in either the liquid or gaseous state.

It may also be an aqueous ammonia solution, possibly/optionally containing ammonium nitrate or urea.

The acid liquid which is introduced into the tubular reactor is advantageously wet-process phosphoric acid in a concentration ranging from about 30 to 54% of $P_2O_5$ or is an acid slurry containing phosphoric acid. It is also possible for sulfuric acid and nitric acid to be introduced at the same time. The reaction between the aforenoted acids and the ammonia is accompanied by a substantial amount of heat being evolved, causing the liquid to boil.

This phenomenon, therefore, results in a powerful jet of water vapor and a slurry of ammonium salts being produced at the outlet of the tubular reactor, with the jet being discharged into the drier. The slurry is projected in a sprayed condition against the shower of solid particles falling from the blades, and against the product which is rolling at the bottom of the drier. The major portion of the slurry thus clings to the surfaces of the particles from the granulator, giving rise to highly regular grains with a mean particle size which is slightly larger than that existing at the outlet of the granulator. However, it has been determined that, when using phosphoric acid at a sufficient level of concentration, for example, on the order of 49% with respect to $P_2O_5$, a fraction of the droplets which are projected into the drier escapes impacting against the solid product while they are still in the liquid condition. These droplets solidify in flight, giving rise to small spheres whose diameters are generally between 0.1 and 0.5 mm. These spheres are found wholly in the dried product which is recycled to the granulator, whether they were entrained in the flow of air and collected at the base of the cyclone separators, or whether they were separated from the finished product by screening.

The proportion of slurry which solidifies in such fashion in the form of small spheres without adhering to the particles from the granulator varies depending on the design of the blades of the drier, the orientation of the jet, and the like. It is generally between 20 and 40% of the flow rate of slurry issuing from the tubular reactor. As will later be seen, this unexpected result is advantageously utilized in producing a high N/P atomic ratio in the finished product.

In the process immediately above described, the water vapor which is produced by the reaction passes into the drier at the same time as the slurry. The presence of the water vapor does not in any way impair the efficiency of the drying action.

To the contrary, it appears that the water vapor which issues from the tubular reactor in a superheated condition, at a temperature of from 120° to 160° C., gives up its heat to the drying air which is discharged from the drier at a temperature of about 85° to 105° C., and thus contributes to supplying the heat required for the drying operation, thereby reducing the heating consumption, i.e., energy requirements.

One of the advantages of the tubular reactor is that it enables production of slurries with a low water content after expansion, for example, less than 8% and as low as 2%, by means of the use of acids at a suitable level of concentration. If a highly concentrated solution, or a molten substance, for example, a more than 94% solution of ammonium nitrate, or urea, is introduced into the granulator at the same time, the heat given off by the reactions and the crystallization operations, bearing in mind the high temperature of the products coming into the drier, may become sufficiently high to cause the water to evaporate, without any need to heat the air which is introduced into the drier. The drier then functions simultaneously as a drier and as a preliminary cooler. By virtue of the reduction in the amount of recycling and the complete use of the reaction heat, the product according to the invention is obtained with a considerable saving of energy.

The amount of liquid materials which is introduced into the mixer-granulator apparatus must be at least sufficient to wet the solid materials and agglomerate the dust materials, thus preventing same from being swept out from the drier. In most cases, it is preferable to produce a partially granulated product containing for example, from 30 to 50% of grains of the desired size, at the granulator outlet.

If the amount of liquid raw materials other than acids, which is to be introduced into the granulator, is not sufficient to achieve the desired granulometry, a simple means makes it possible to achieve this effect.

This means comprises dividing the flow of acids into two fractions. One fraction is charged into the tubular reactor which feeds the drier. The other fraction is separately neutralized and the resulting slurry is introduced into the granulator. The neutralization operation may be performed by means of any known apparatus, for example, a vat, or a second tubular reactor communicating with the granulator.

If, in contrast, the amount of liquid materials other than acids, which is to be introduced into the granulator, is too large to permit a low rate of recycling, this problem may be remedied by spraying a portion of the liquid materials into the drier.

A simple way of performing that operation without additional equipment comprises introducing the desired fraction of liquid materials into the tubular reactor for the drier, which provides the spraying effect. When using a concentrated solution of ammonium nitrate or urea, it is preferable for the aforementioned desired fraction of liquid materials to be introduced close to the outlet of the tubular reactor to avoid decomposition of the salts in a hot and acid medium.

In industrial practice, it is characteristically the first alternative which is the preferred, namely, diverting a portion of the acid flow to the granulator. Dividing the flow of acids between the neutralization reactors which respectively feed the granulator and the drier is a very simple, practical and efficient way of controlling granulation. This makes it possible to conduct the operation with a low degree of recycling, less than 5 times production and generally less than 3 times production. Experience has shown that the granulation effect is very stable; the distribution of the liquids as between the granulator and the drier may be varied over wide limits, without any need to substantially modify the recycling.

The subject process, therefore, provides a high degree of flexibility in regard to adjustments, and permits the unit operation to be conducted most readily.

In general, if the total amount of the liquid materials which are introduced into the granulator and into the drier is considered, including the slurries resulting from neutralization of the acids, the fraction of the total mass of the liquid materials introduced into each of such two apparatuses remains between 10 and 90% of the total mass of the liquid materials.

It is just as easy with the process according to the invention as with the conventional processes, for the N/P atomic ratio of the ammonium phosphate contained in the finished product to be adjusted, as desired, to any value ranging from about 1.0 to 1.8; stated differently, it is quite easy to produce virtually the entire range of mixtures of monoammonium phosphate and diammonium phosphate. The amount of ammonia introduced into the neutralization reactor which supplies the granulator, and into the tubular reactor which supplies the drier, is typically adjusted to completely neutralize the acids other than phosphoric acid, and to neutralize phosphoric acid to provide a N/P ratio of between 0.8 and 1.6, preferably between 1.0 and 1.4. The additional injection of ammonia into the granulator below the bed of product makes it possible to raise the N/P ratio, and in all cases to achieve a value of that ratio which is equal to or higher than 1.0, in the finished product.

It is typically preferred for the tubular reactor which opens into the drier to be operated at a ratio of higher than 1.0 but lower than 1.4, in order to limit the ammonia loss. In spite of this, it is possible for the N/P ratio in the finished product to be as high as with the conventional processes, being, for example, between 1.5 and 1.8.

For that purpose, the amount of ammonia injected into the granulator is sufficient to produce a N/P ratio which is between 1.6 and 2.0 in the wet solid product which is charged into the drier. Spraying a slurry with an N/P ratio of 1.0 to 1.4 into the drier lowers the mean atomic ratio in the product which exits the drier, but that effect is less noticeable in the fraction of product of the desired size which forms the finished product because, as has already been seen, a portion of the slurry projected by the tubular reactor crystallizes in flight in the form of very small spheres which are recovered at the bottom of the cyclone separators or in the fines separated from the granulated finished product by the screening operation.

These fine particles essentially consisting of monoammonium phosphate are thus wholly recycled to the granulator where their divided state and their large surface area are eminently favorable for the absorption of the ammonia which is injected into the granulator, until same are converted into diammonium phosphate.

In addition, the loss of ammonia in the drier is much lower than in the processes heretofore known to the prior art, which is attributed to the fact that each grain of product is surrounded or encapsulated by a film with a high monoammonium phosphate content, which retains the ammonia which is given off in the drying operation by the diammonium phosphate contained in the grain centers.

For these two reasons, the N/P ratio in the calibrated finished product is higher than would be expected by applying the rule of mixtures, and taking into account the loss of ammonia which is usually found when drying a product containing diammonium phosphate.

It should be noted that the film with the high monoammonium phosphate content, which encapsulates each particle recycled to the granulator, is in a divided, porous physical state which greatly enhances the absorption of ammonia in the granulator.

This highly desirable property enjoyed by the surface layer of monoammonium phosphate which is deposited on the grains by the tubular reactor of the drier is a marked advantage of the subject process over the state of this art.

When producing fertilizers containing diammonium phosphate, it is essential that the ammonia which evolves from the granulator should be recovered from the drier and possibly also the neutralization vessel which supplies the granulator. For that purpose, the gases extracted from those apparatuses are washed by contacting same with an aqueous solution which is maintained in an acid state by makeup sulfuric, nitric or phosphoric acid.

At the same time, such washing operation eliminates the dust materials which have escaped from the cyclone separators. This results in a solution which has a high proportion of fertilizing salts, which has to be recycled to the production process. This liquid effluent can be introduced into the granulator or into the neutralization reactors. Introducing same into the tubular reactor which openly communicates with the drier provides an additional amount of water which enhances the fixing of the ammonia.

When producing commercial diammonium phosphate in which the N/P atomic ratio is typically between 1.81 and 1.85, a preferred embodiment comprises introducing into the mixer an amount of recycled dried product which is equal to about 3 times the production, using a phosphoric acid whose concentration is advantageously between 42 and 50% in respect of $P_2O_5$, depending in particular on whether the ammonia is in liquid or gaseous state, dividing the stream of phosphoric acid into two substantially equal parts, and neutralizing the two parts to an N/P atomic ratio of 1.2 to 1.5 in two tubular reactors which respectively feed into the granulator and into the drier, injecting ammonia below the bed of product in the granulator such that the N/P atomic ratio in the product issuing from the granulator ranges from 1.9 to 2.

The process according to the invention may readily be performed using apparatus comprised of conventional components for the production of granulated fertilizers.

Indeed, it is necessary only to provide a tubular neutralization reactor which openly communicates with the drier, this being a simple and inexpensive piece of equipment. This results in a considerable reduction in recycling and a substantial savings in regard to the amount of heat consumed, with the amount of heat consumed in some cases being reduced to zero.

By virtue of these two effects in combination, production can generally be increased by more than 50%, provided that the ancillary equipment, in particular the means supplying the apparatus with solid and liquid raw materials, the cooling arrangement and the arrangement for discharge of the finished product, are adapted to the new flow rates.

Instead of introducing an acid or a mixture of acids into the tubular reactor of the drier, it is also possible to introduce an acid slurry, for example, a slurry which is produced by attacking a natural phosphate with an excess of an acid liquid containing at least one of phosphoric, nitric and sulfuric acids. For example, in certain processes for the production of NP/NPK fertilizers, natural phosphate is attacked by means of nitric acid, the calcium nitrate formed is separated by crystallization, the acid slurry produced is neutralized with ammonia in a series of stirred tanks, and the final slurry is generally concentrated down to less than 6% of water before granulation. In the process according to the invention, the concentration step is omitted and the neutralization step is effected by means of two tubular reactors which respectively feed into the granulator and into the drier. The acid slurry is distributed between the two tubular reactors such as to provide the best control over granulation. In spite of the high water content in the slurries, this process makes it possible to operate with an extent of dried material recycling, which is less than 5 times production.

The process according to the invention is used for the production of a widely varying range of granulated NP/NPK fertilizers. Particular mention is made of the following such fertilizers:

[i] Ammonium phosphates: monoammonium, diammonium and mixtures thereof;

(ii) Fertilizers based on ammonium phosphate and sulfate, the sulfuric and phosphoric acids being distributed in suitable proportions between the tubular reactors of the granulator and the drier such as to adjust the granulation to provide the optimum effect;

(iii) Fertilizers based on ammonium nitrate and ammonium phosphate (the solution of ammonium nitrate is introduced into the granulator and a fraction may be diverted to the tubular reactor of the drier; the phosphoric acid is distributed between the neutralization reactor, for example, a tubular reactor, which feeds the granulator, and the tubular reactor of the drier);

(iv) Fertilizers based on urea and ammonium phosphate, same procedure and same alternative forms; and (v) Fertilizers produced by processes which are referred to as "nitric attack" processes, whether they involve attacking natural phosphate by means of nitric acid alone, with crystallization of the calcium nitrate, or attacking the phosphate by means of a mixture of nitric, sulfuric and phosphoric acids.

It will be appreciated that the process of the invention is advantageously also applied to the preparation of various substances from liquid raw materials which are reacted in a tubular reactor, with the reactor feeding into a drier or into a calcinator.

Figure 1:
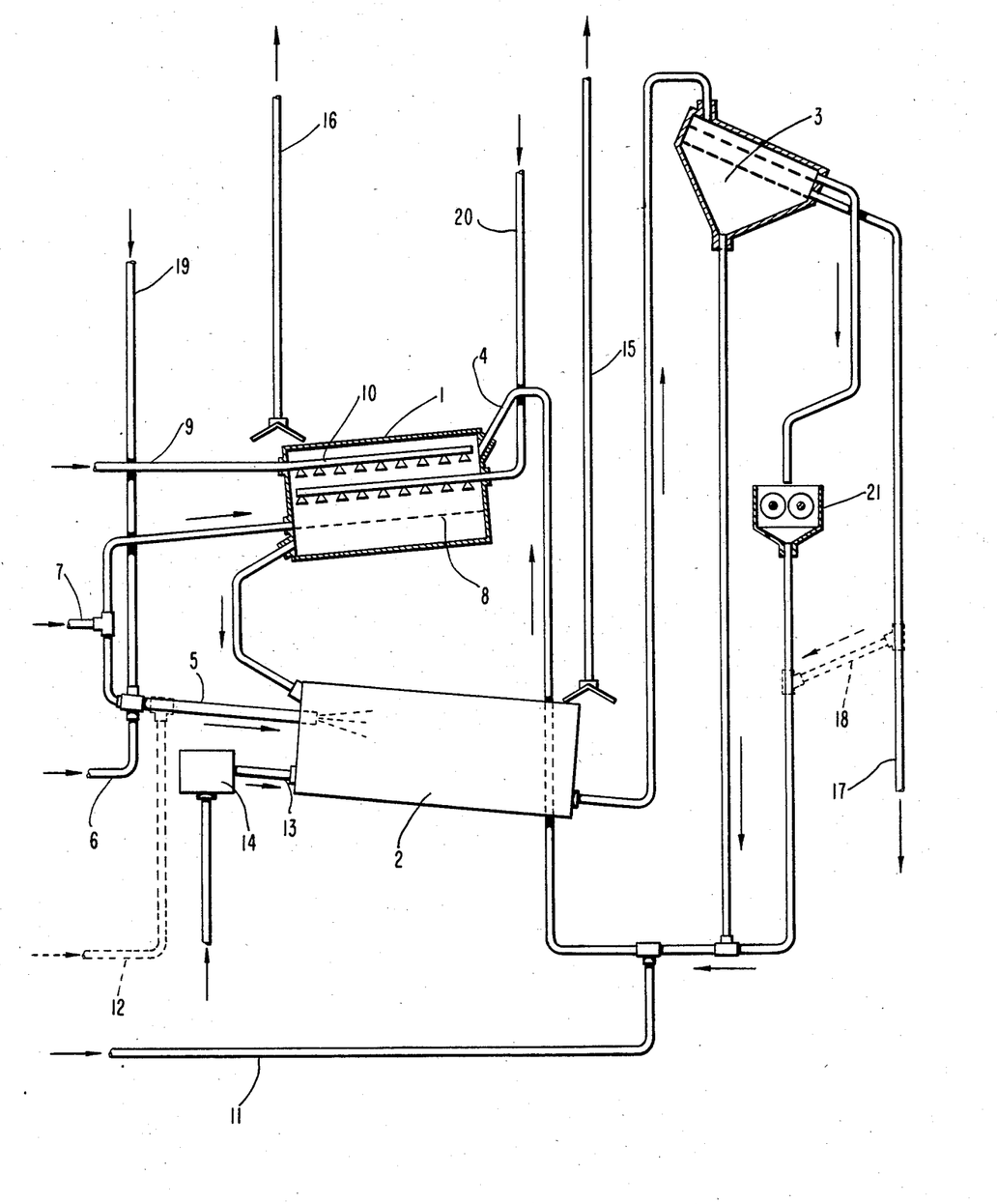

In order to more fully illustrate the present invention and the advantages thereof, the following specific examples are given with reference to the accompanying FIGURE of Drawing, it being understood that same are intended only as illustrative and in nowise limitative.

In said examples which follow, there was utilized apparatus which essentially comprised:

[1] A mixer/granulator 1 and a drier 2 which are operably communicating in series. In the following examples, the granulator 1 and the drier 2 comprise rotary drums having their longitudinal axes slightly inclined with respect to a horizontal plane, as illustrated;

[2] A screen apparatus 3 which receives the materials issuing from the drier and which provides for classification thereof into three fractions. The substance which is of excessive size is crushed at 21 and recycled to one inlet of the granulator at 4, at the same time as the excessively fine substance;

[3] A tubular neutralization reactor 5 which directly openly communicates into the drier and optionally a second tubular reactor (not shown) which likewise directly openly communicates into the granulator 1.

The raw materials or various feedstocks are introduced into the aforesaid apparatus in the following manner:

Via line 6, the phosphoric acid is charged into the tubular reactor 5; and through line 7 the ammonia which is distributed between the tubular reactor 5 and an inclined ammoniator 8 which is disposed below the level of the contents of the granulator;

The aqueous solution (for example, of ammonium nitrate or urea) inlets through line 9, and is distributed throughout the granulator 1 via tube 10 which is provided with holes or other spraying means:

The solid raw materials are introduced into the system via the line 11, into the particles recycle; and optionally, a fraction of nitric acid is introduced through an inlet 12.

The drying air is charged into the drier at 13 and, if necessary, is heated in heater 14; it is discharged with the water vapor at vent 15; likewise, the gases are discharged from the mixer/granulator at vent 16.

The final product is collected at outlet 17 with a fraction thereof being possibly recycled, via line 18.

The liquid effluent or effluents from the gas scrubbers (not shown) is or are introduced at 19 and/or 20, i.e., into the tubular reactor at 19 and/or into the granulator at 20.

EXAMPLE 1

Production of diammonium phosphate:

A commercially available product was prepared, having the formula 18-46-0, and the following composition:

| | | |
|---|---|---|
| $NH_3$ | 218.6 | comprising $\begin{cases} 18.6 \text{ fixed by } H_2SO_4 \\ 200.0 \text{ fixed by } H_3PO_4 \end{cases}$ |
| $H_2SO_4$ | 53.6 | |
| Phosphoric acid: | | |
| $P_2O_5$ | 460.0 | |
| $H_2O$ bound to $P_2O_5$ | 174.8 | |
| Impurities | 83.0 | |
| Free $H_2O$ | 10.0 | |
| | 1000.0 | |

In the aforesaid fertilizer species, the N/P atomic ratio is 1.82.

Wet-process phosphoric acid having a concentration of 48% of $P_2O_5$, and anhydrous liquid ammonia were used.

The apparatus of the FIGURE of Drawing was employed, using two tubular reactors which respectively fed the granulator and the drier. The sulfuric acid and the liquid effluent from the gas scrubbing system (not shown) were introduced into the tubular reactor associated with the granulator.

The stream of phosphoric acid was divided into two substantially equal fractions:

The first fraction was utilized as feed for the tubular reactor associated with the granulator, which was operated at a ratio of 1.35 to 1.45. The additional injection of ammonia under the product bed raised that ratio to a value of 1.96 in the material charged into the drier.

The second fraction of the phosphoric acid was neutralized in the tubular reactor associated with the drier, down to a ratio of 1.2.

With the recycling being controlled at a rate of 3 times production, for one molecule of $H_3PO_4$ contained in the final product, the following were therefore admixed at the intake of the drier:

$$\begin{array}{l} 3.5 \text{ mole of } H_3PO_4 \text{ neutralized by } 3.5 \times 1.96 = 6.86 \text{ mole of } NH_3 \\ \underline{0.5 \text{ mole of } H_3PO_4 \text{ neutralized by } 0.5 \times 1.02 = 0.60 \text{ mole of } NH_3} \\ \phantom{xx} 4.0 \text{ mole of } H_3PO_4 \text{ neutralized by } 7.46 \text{ mole of } NH_3 \end{array}$$

which corresponds to an N/P ratio of 1.865, in the entire mass of the product issuing from the drier, if there were no loss of ammonia during the course of the drying operation.

In actual fact, two contrasting effects provided a slightly different N/P ratio in the fraction of that material which was of the ultimately desired size and which formed the final product:

(I) On the one hand, a portion of the slurry, with an N/P ratio of 1.2, solidified "in flight" to form fine particles, without being incorporated in the grains of desired size, thus contributing to a higher N/P ratio in the grain particles than in the fines, and (II) On the other hand, the drying was accompanied by a certain loss of ammonia, which slightly reduced the N/P ratio in the grains.

In sum, the N/P ratio in the calibrated finished product was established at 1.82 to 1.84.

The loss of ammonia in the course of the drying operation was at a much lower level than in the prior art processes utilizing the ammoniator-granulator, being only about 3%, instead of 7%.

By virtue of the slurry being distributed between the granulator and the drier, as aforesaid, the recycling rate was reduced to 3 times the production, as compared to 5 to 6 times production per the prior art.

EXAMPLE 2

An NPK fertilizer having the formula 17-17-17, based on ammonium phosphate and nitrate, was produced in a granulation apparatus comprising an arrangement, in series, of a granulator and a rotary drier, with recycling of the dried product to the head of the granulator. The granulator and the drier were each equipped with a tubular reactor for neutralization of phosphoric acid with anhydrous ammonia.

The respective amounts of feed introduced at different points in the installation are set forth in the Table I which follows. Ordinary superphosphate was used to adjust the grade of the fertilizer.

In order to recover that small amount of ammonia (from 5 to 10% of the total) which escaped from the granulator and the drier, a fraction of the phosphoric acid (or the nitric acid which was used to prepare the ammonium nitrate) was diverted to the gas scrubbing system, from which it was then returned to one or the other of the tubular reactors.

This did not alter the overall balance of the raw materials, but introduced an additional amount of water.

The aforesaid water makeup was adjusted such as to maintain the specific gravity of the liquid circulating through the gas scrubbers at a value below 1.4, in order to avoid crystallization and in order to effect efficient scrubbing of the gases which contained ammonia and dust material. This water makeup amount, relative to the direct use of phosphoric acid containing 49% of $P_2O_5$ or a 92% solution of $NH_4NO_3$, appears under the heading "Water returning from the gas scrubbers", the third entry from the end of Table I.

The N/P atomic ratio at different points in the system is set forth in Table II.

This ratio is slightly higher in the final product than would be expected strictly on the basis of the rule of mixtures, because of the presence in the recycled fines, of the small spheres of monoammonium phosphate, which solidified in flight in the drier.

The advantages of the process of the invention, which in this case consisted of introducing half the stream of phosphoric acid into the tubular reactor associated with the drier, are to be found in Table II, the base of such Table reporting the results obtained with a known process which comprised introducing the entire mass of the phosphoric acid into the tubular reactor associated with the granulator.

The extent of recycling drops from 6 to 3.2 times production per this invention, the consumption of fuel drops by one-half, with all other factors being equal, and in an existing installation, the production capacity increases by 53%. Production is not limited by recycling capacity, moreover, but only by the constraints inherent in the apparatus.

The product obtained in accordance with this example is substantially spherical and is of the following grain size: particles with a diameter of more than 4 mm: 0; between 3.15 and 4 mm: 35%; and between 2 and 3.15 mm: 65%.

In the following additional examples, the amounts used and the particular operating conditions employed are set forth in Tables I and II hereinafter.

EXAMPLE 3

In this example, and also in the following Examples 4 and 7, the apparatus of the FIGURE of Drawing was utilized, which comprised a single tubular reactor which directly openly communicated with the drier and into which the entire mass of the phosphoric acid was introduced.

EXAMPLE 4

In this example, both the phosphoric acid and the nitric acid were introduced into the tubular reactor, the nitric acid being represented by the broken line 12.

Only a small amount of ammonium nitrate liquor was retained in the granulator to agglomerate the dust materials and to prevent same from being swept out from the drier in which the essence of the granulation step was carried out. By virtue of using 58% nitric acid in the tubular reactor associated with the drier, the amount of water to be evaporated was 2.05 times greater than that in Example 3, but the total amount of ammonia used was multiplied by 1.91, thereby increasing the heat generated by neutralization, in approximately the same proportions.

EXAMPLES 5 and 6

The procedure of Example 2 was repeated, but using different values with respect to the distribution of the phosphoric acid between the tubular reactors associated with the granulator and the drier.

EXAMPLE 7

The procedure of Examples 3 and 4 was repeated.

Table II also sets forth the values of the N/P atomic ratio, at different points in the system.

Although the N/P ratio at the outlet of the tubular reactor associated with the drier was limited to a value of approximately 1.2, in order to avoid losses of ammonia which are difficult to recover, the process according to the invention enabled production of fertilizers containing a considerable proportion of diammonium phosphate, as shown by Examples 2 to 6.

Another advantage of the invention is that by adjusting the N/P ratio to a value above 1, at all points in the system, it is possible to virtually eliminate any emissions of fluorine whatsoever.

The base of Table II reports performance in the same apparatus but without installation of the tubular reactor which feeds to the drier. Comparison with the results of the process of the invention makes it possible to appreciate the surprising results which have been achieved.

In the case of the fertilizers 18-22-12 and 15-20-20, the increase in production was 60 to 70%. The consumption of electrical energy was reduced by the same proportions, while fuel consumption was totally eliminated.

TABLE I

Amounts charged into the granulator and into the tubular reactor associated with the drier, in kilograms per ton of final product:

| Example No. | 2 | 3 | 4 |
|---|---|---|---|
| Formula: | 17-17-17 | 17-17-17 | 17-17-17 |
| Feed to the granulator: | | | |
| (1) Solid materials: | | | |
| Recycled dry product; | 3200 | 2500 | 2000 |
| 18% $P_2O_5$ superphosphate; | 54 | 45 | 45 |
| Potassium chloride containing 60% $K_2O$ | 284 | 284 | 284 |
| Total solids | 3538 | 2829 | 2329 |
| (2) Liquid materials: | | | |
| (a) Introduced directly, 92% solution of $NH_4NO_3$; | 363 | 378 | 100 |
| Ammonia injected into the product bed | 18 | 16 | 16 |
| (b) Introduced via the tubular reactor; Phosphoric acid with 49% of $P_2O_5$; | 164 | — | — |
| Ammonia; | 27 | — | — |
| Water returning from the gas scrubbers | 12 | — | — |
| Sub-total liquid materials | 582 | 394 | 116 |
| Feed to the tubular reactor associated with the drier | | | |
| Nitric acid containing 58% of $NHO_3$; | — | — | 350 |
| Phosphoric acid with 49% of $P_2O_5$; | 164 | 331 | 331 |
| Ammonia; | 20 | 43 | 97 |
| Water returning from the gas scrubbers | — | 7 | 9 |
| Sub-total liquid materials | 184 | 381 | 787 |
| Total liquid materials | 766 | 775 | 903 |
| Total $H_2O$ evaporated in the granulator and in the drier | 104 | 104 | 232 |

| Example No. | 5 | 6 | 7 |
|---|---|---|---|
| Formula: | 15-20-20 | 18-22-12 | 23-23-00 |
| Feed to the granulator: | | | |
| (1) Solid materials: | | | |
| Recycled dry product; | 2500 | 3000 | 3000 |
| 18% $P_2O_5$ superphosphate; | 22 | 60 | 68 |
| Potassium chloride containing 60% $K_2O$ | 334 | 200 | — |
| Total solids | 2856 | 3260 | 3068 |
| (2) Liquid materials: | | | |
| (a) Introduced directly, 92% solution of $NH_4NO_3$; | 265 | 345 | 577 |
| Ammonia injected into the product bed | 24 | 26 | — |
| (b) Introduced via the tubular reactor, Phosphoric acid with 49% of $P_2O_5$; | 100 | 86 | — |
| Ammonia; | 16 | 14 | — |
| Water returning from the gas scrubbers | 8 | 9 | — |
| Sub-total liquid materials | 413 | 480 | 577 |
| Feed to the tubular reactor associated with the drier | | | |
| Nitric acid containing 58% of $NHO_3$; | — | — | — |
| Phosphoric acid with 49% of $P_2O_5$; | 300 | 342 | 445 |
| Ammonia; | 39 | 44 | 54 |
| Water returning from the gas scrubbers | — | — | 3 |
| Sub-total liquid materials | 339 | 386 | 502 |
| Total liquid materials | 752 | 866 | 1079 |
| Total $H_2O$ evaporated in the granulator and in the drier | 108 | 126 | 147 |

TABLE II

Distribution of the liquid raw materials between the granulator and the drier, and other operating conditions:

| Example No. | 2 | 3 | 4 |
|---|---|---|---|
| Formula: | 17-17-17 | 17-17-17 | 17-17-17 |
| Distribution of the liquid materials | | | |
| Phosphoric acid: | | | |
| % to granulator | 50 | 0 | 0 |
| % to drier | 50 | 100 | 100 |
| Solution of ammonium nitrate: | | | |
| % into granulator | 100 | 100 | 26.3 |
| % into drier | 0 | 0 | 73.7 |
| Entire mass of the liquid materials: | | | |
| % into granulator | 76 | 51 | 13 |
| % into drier | 24 | 49 | 87 |
| Liquid materials / Solid materials ratio charged into granulator | 0.16 | 0.14 | 0.05 |
| N/P atomic ratio: | | | |
| (i) At outlet of the tubular reactor associated with the granulator; | 1.40 | — | — |
| (ii) At granulator outlet; | 1.73 | 1.61 | 1.67 |
| (iii) At outlet of the tubular reactor associated with the drier; | 1.04 | 1.10 | 1.10 |
| (iv) At outlet of the drier (final product) | 1.66 | 1.49 | 1.48 |
| Recycling rate: | 3.2 | 2.5 | 2.0 |
| Production per hour in tons: | 92 | 92 | 92 |
| Consumption of fuel oil in kg per ton of final product: | 4 | 3 | 3 |
| By way of comparison: Operating conditions without using the tubular reactor associated with the drier: | | | |
| Recycling rate: | 6 | 6 | 6 |
| Production per hour in tons: | 60 | 60 | 60 |
| Consumption of fuel oil in kg per ton of final product: | 8 | 8 | 8 |

| Example No. | 5 | 6 | 7 |
|---|---|---|---|
| Formula: | 15-20-20 | 18-22-12 | 23-23-00 |
| Distribution of the liquid materials | | | |
| Phosphoric acid: | | | |
| % to granulator | 25 | 20 | 0 |
| % to drier | 75 | 80 | 100 |
| Solution of ammonium nitrate: | | | |
| % into granulator | 100 | 100 | 100 |
| % into drier | 0 | 0 | 0 |
| Entire mass of the liquid materials: | | | |
| % into granulator | 55 | 55.4 | 53.5 |
| % into drier | 45 | 44.6 | 46.5 |
| Liquid materials / Solid materials ratio charged into granulator | 0.14 | 0.15 | 0.19 |
| N/P atomic ratio: | | | |
| (i) At outlet of the tubular reactor associated with the granulator; | 1.36 | 1.39 | — |
| (ii) At granulator outlet; | 1.80 | 1.78 | 1.00 |
| (iii) At outlet of the tubular reactor associated with the drier; | 1.10 | 1.09 | 1.00 |
| (iv) At outlet of the drier (final product) | 1.67 | 1.67 | 1.00 |
| Recycling rate: | 2.5 | 3.0 | 3.0 |

TABLE II-continued

Distribution of the liquid raw materials between the
granulator and the drier, and other operating conditions:

| | | | |
|---|---|---|---|
| Production per hour in tons: | 95 | 85 | 80 |
| Consumption of fuel oil in kg per ton of final product: | 0 | 0 | 0 |
| By way of comparison: | | | |
| Operating conditions without using the tubular reactor associated with the drier: | | | |
| Recycling rate: | 4.5 | 5.3 | 6 |
| Production per hour in tons: | 70 | 65 | 55 |
| Consumption of fuel oil in kg per ton of final product: | 7 | 7 | 6 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A continuous process for the production of solid particulates comprising ammonium phosphate, said process comprising: introducing recycled dried product and liquid and solid feedstocks into a mixing zone; passing the resulting mixtures into a drying zone through which passes a flow of gas; simultaneously introducing an acidic liquid and an ammoniacal fluid into a confined and elongate reaction zone to partially neutralize said acidic liquid by said ammoniacal fluid and to produce a jet of reaction mixture comprising slurry and water vapor, said confined and elongate reaction zone being arranged and constructed so as to directly openly communicate into said drying zone so as to project said reaction mixture comprising slurry and water vapor onto the wet solid product which emanates from said mixing zone and to simultaneously dry the product resulting therefrom; and then collecting the resulting dry product at the outlet of the drying zone.

2. The process as defined by claim 1, for the production of granulated NP/NPK fertilizers.

3. The process as defined by claim 1, wherein said jet comprises a slurry of fertilizing ammonium salts and is produced by chemical neutralization of the acidic liquid with the ammoniacal fluid in said confined and elongate reaction zone directly openly communicating into said drying zone, and wherein said jet is generated and injected into said drying zone with evolved heat of neutralization.

4. The process as defined by claim 3, either or both of said acidic liquid and ammoniacal fluid containing water.

5. The process as defined by claim 4, said acidic liquid comprising wet-process phosphoric acid.

6. The process as defined by claim 4, said acidic liquid comprising an acid slurry containing phosphoric acid.

7. The process as defined by claim 4, said acidic liquid comprising phosphoric acid.

8. The process as defined by claim 7, said acidic liquid further comprising sulfuric and/or nitric acid.

9. The process as defined by claim 4, said ammoniacal fluid being liquid or gaseous anhydrous ammonia.

10. The process as defined by claim 9, said ammoniacal fluid being an aqueous ammonia solution.

11. The process as defined by claim 10, said aqueous ammonia solution further comprising ammonium nitrate.

12. The process as defined by claim 10, said aqueous ammonia solution further comprising urea.

13. The process as defined by claim 7, at least 99% of said phosphoric acid being neutralized to monoammonium phosphate.

14. The process as defined by claim 7, the phosphoric acid liquid comprising from 30 to 54% by weight $P_2O_5$.

15. The process as defined by claim 3, said liquid feedstock introduced into said mixing zone comprising an aqueous solution of ammonium nitrate.

16. The process as defined by claim 3, said liquid feedstock introduced into said mixing zone comprising an aqueous solution of urea.

17. The process as defined by claim 1, further comprising ammoniating the admixture in said mixing zone.

18. The process as defined by claim 1, wherein the gas passing through the drying zone is heated.

19. The process as defined by claim 1, said solid feedstock comprising superphosphate.

20. The process as defined by claim 19, said solid feedstock comprising a potassium salt.

21. The process as defined by claim 1, said feedstocks comprising a slurry of ammonium phosphate.

22. The process as defined by claim 1, comprising recovering one fraction of dried final product of predetermined particle size, and recycling those fractions of under- and oversized particles.

23. The process as defined by claim 22, further comprising crushing said oversized particles prior to the recycle thereof to said mixing zone.

24. The process as defined by claim 3, further comprising separately neutralizing a portion of the acidic liquid with the ammoniacal fluid and introducing the slurry which results into said mixing zone.

25. The process as defined by claim 24, said separate neutralization being conducted in a second confined and elongate reaction zone directly openly communicating with said mixing zone.

26. The process as defined by claim 1, further comprising separately adding a fraction of nitric acid to said confined and elongate reaction zone.

27. The process as defined by claim 1, said drying zone comprising a rotary drier provided with means for distributing throughout the active volume thereof, as a shower of particles, the wet solids transferred from the mixing zone.

28. The process as defined by claim 27, said confined and elongate reaction zone directly openly communicating with said drying zone comprising means for disturbing or interrrupting the fluid flow therethrough.

29. The process as defined by claim 1, the extent of recycle being less than 5 times the amount of dried final product recovered.

30. The process as defined by claim 1, the extent of recycle being less than 3 times the amount of dried final product recovered.

31. The process as defined by claim 1, said jet comprising from 10 to 90% of the total amount of liquid feedstock introduced into the process sequence.

32. The process as defined by claim 25, wherein the two neutralizations in the respective confined and elongate reaction zones are to an N/P atomic ratio of from 1.2 to 1.5 and the admixture in said mixing zone is ammoniated to an N/P atomic ratio of from 1.9 to 2, and whereby there is prepared a granular diammonium phosphate having an N/P atomic ratio of from 1.81 to 1.85.

33. The process as defined by claim 1, said jet having a water content of less than 8%.

34. The process as defined by claim 1, the liquid feedstock comprising molten fertilizer values.

35. The process as defined by claim 1, the dried final product comprising a surface film of monoammonium phosphate on the individual particles thereof.

36. The process as defined by claim 1, further comprising scrubbing those gases discharged from the mixing zone and/or said confined and elongate reaction zone directly openly communicating with said drying zone, with an aqueous wash solution of sulfuric, nitric or phosphoric acid.

37. The process as defined by claim 36, further comprising cycling liquid wash effluent to said mixing zone and/or confined and elongate reaction zone.

38. The process as defined by claim 1, wherein a fraction of the droplets comprising said jet solidify prior to impinging upon the drying particles of wet solids transferred from the mixing zone.

39. The product of the process as defined by claim 1.

* * * * *